United States Patent Office 3,206,469
Patented Sept. 14, 1965

3,206,469
6-HALOPENICILLANIC ACID
Giorgio Pifferi, Milan, Italy, assignor to
Lepetit S.p.A., Milan, Italy
No Drawing. Filed July 9, 1962, Ser. No. 208,579
Claims priority, application Great Britain Aug. 15, 1961
3 Claims. (Cl. 260—306.7)

6-aminopenicillanic acid (6–APA), originally named "penicin" by Sakaguchi and Murao [J. Agric. Chem. Soc. 23, 411 (1950)], who reported hydrolysis of penicillin G by an enzyme present in *Penicillium chrysogenum*, became available in large amounts in 1959 when Batchelor et al. [Nature 183, 257 (1959)] described the isolation of 6–APA from penicillin fermentation broths grown in absence of precursors. Since then 6–APA has been subjected to reaction with a number of acid chlorides or acid anhydride in order to obtain new "synthetic" penicillins.

This invention relates to new antibacterial 6-halo-penicillanic acids of the general formula:

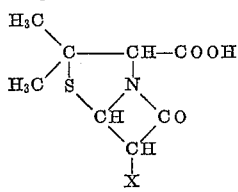

wherein X is a halogen atom.

The process for preparing the new compounds consists in diazotizing 6-aminopenicillanic acid at 0–2° C. in the appropriate diluted hydrohalogen acid; the β-lactam ring, although generally easily hydrolysed, is not affected in the above diazotization conditions and the compound can be isolated in good yields.

The halopenicillanic acids of the invention show a high degree of antibacterial activity, as shown in the following table, which gives the minimum inhibitory concentration in mcg./ml. on some microorganisms:

|  | 6-chloropenicillanic acid | 6-bromopenicillanic acid |
|---|---|---|
| S. faecalis | 5 | 2 |
| Staph. PV 43 | 10 | 5 |
| Staph. PV 46 | >100 | >100 |
| E. coli | 1 | 2 |
| Shigella sonnei | 5 | 5 |

The halopenicillanic acids of the invention can also be useful as intermediates for the preparation of antimicrobiologically active substances having the penicillin ring system.

The following non-limitative examples illustrate the invention.

EXAMPLE 1

*6-chloropenicillanic acid*

A solution of 6.5 g. of 6–APA in 100 ml. of N hydrochloric acid is cooled to 0–2° C. and a solution of 2.5 g. of sodium nitrite in 20 ml. of water is added dropwise. One hour after the completion of the addition, the temperature is allowed to rise to 15–18° C. and the separated oil extracted with ethyl ether.

The organic layer is dried over sodium sulphate and the ether evaporated in vacuo at room temperature. The oily residue, 4.5 g. shows in the infra red spectrum bands at 1725 cm.$^{-1}$ (C=O stretching of carboxylic group) and at 1770 cm.$^{-1}$ (C=O stretching of β-lactam fused to thiazolidine ring) in agreement with the expected structure.

This oil, which decompises under distillation, is dissolved in ethyl ether and treated with an ether solution of dibenzylethylenediamine: 5.5 g. of dibenzylethylenediamine salt are obtained, which, after several crystallisations from aqueous ethanol, melts at 159–150° C.; [α]$_D$=+154.4 (c.=0.5% in methanol).

*Analysis.*—Calcd. for $C_{32}H_{40}Cl_2N_4O_6S_2$: C, 54.00; H, 5.67; N, 7.88; S, 9.01; Cl, 9.97. Found: C, 53.75; H, 6.19; N, 7.65; S, 8.99; Cl, 10.24.

EXAMPLE 2

*6-bromopenicillanic acid*

It is prepared essentially in the same way described in Example 1, starting from 4.32 g. of 6-APA dissloved in 50 ml. of 2.5 N sulphuric acid containing 10.4 g. of sodium bromide and adding dropwise a solution of 2.12 g. of sodium nitrate in 10 ml. of water. The oily residue (4.88 g.) shows infrared bands at 1770 and 1725 cm.$^{-1}$. On treatment with an ether solution of dibenzylethylenediamine, 3.4 g. of dibenzylethylenediamine salt are obtained, which, recrystallized from aqueous ethanol, melts at 164–165° C.; [α]$_D$=+140.9 (C=0.5% in methanol).

*Analysis.*—Calcd. for $C_{32}H_{40}Br_2N_4O_6S_2$: C, 48.00; H, 5.03; N, 6.99; S, 8.00; Br, 19.96. Found: C, 48.17; H, 5.11; N, 7.28; S, 7.85; Br, 19.90.

I claim:
1. A 6-halopenicillanic acid of the formula:

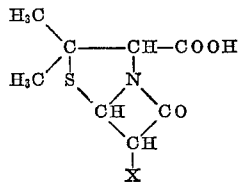

wherein X is a member of the class consisting of chlorine and bromine atoms.
2. 6-chloropenicillanic acid.
3. 6-bromopenicillanic acid.

References Cited by the Examiner

UNITED STATES PATENTS

| | | | |
|---|---|---|---|
| 2,941,995 | 6/60 | Doyle et al. | 260—239.1 |
| 3,040,032 | 6/62 | Doyle et al. | 260—239.1 |
| 3,041,333 | 6/62 | Chow et al. | 260—239.1 |
| 3,071,575 | 1/63 | Doyle et al. | 260—239.1 |
| 3,071,576 | 1/63 | Doyle et al. | 260—239.1 |

OTHER REFERENCES

Morton: The Chemistry of Heterocyclic Compounds, page VI of the preface (1946).
Simons: Fluorine Chemistry, page 402 (1950).
Wertheim: Textbook or Organic Chemistry, pages 79–81 and 310–311 (1945).

NICHOLAS S. RIZZO, *Primary Examiner.*